Nov. 23, 1965   F. KUHRT ETAL   3,219,989
SIGNAL-TRANSMITTING APPARATUS FOR CONVEYANCES
TRAVELLING BETWEEN STATIONS
Filed March 2, 1961   3 Sheets-Sheet 1

Nov. 23, 1965    F. KUHRT ETAL    3,219,989
SIGNAL-TRANSMITTING APPARATUS FOR CONVEYANCES
TRAVELLING BETWEEN STATIONS
Filed March 2, 1961    3 Sheets-Sheet 3

United States Patent Office 3,219,989
Patented Nov. 23, 1965

3,219,989
SIGNAL-TRANSMITTING APPARATUS FOR CONVEYANCES TRAVELLING BETWEEN STATIONS
Friedrich Kuhrt and Hans-Joachim Lippmann, Nurnberg, Germany, assignors to Siemens-Schuckertwerke Aktiengesellschaft, Berlin-Siemensstadt, Germany, a corporation of Germany
Filed Mar. 2, 1961, Ser. No. 93,832
Claims priority, application Germany, Mar. 5, 1960, S 67,431
4 Claims. (Cl. 340—174.1)

Our invention relates to apparatus for transmitting control signals in conveyor or other transportation system in which the vehicles or other travelling objects are impressed, for instance at a loading station, with magnetic code signals and in which these signals, when the object passes by another station, are magnetically transferred to a receiver station for initiating a corresponding control operation, such as for changing the travel path of the object to direct it to a selected destination. Such signal-transmission systems, operating on a magnetic proximity principle, are disclosed in the copending applications Serial No. 833,185, filed August 13, 1959, and Serial No. 9,542, filed February 18, 1960, now Patent No. 3,080,550, both assigned to the assignee of the present invention.

Signalling systems of the above-mentioned type are applicable, for example, to belt or roller conveyors for the purpose of distributing the individual objects travelling on the conveyor, to predetermined branch paths or destinations, as well as for analogously controlling the rail switches for mules in mines, or for directing the conveyor cartridges in pneumatic tube conveyors to selected receiving stations, the latter type of application being particularly dealt with hereinafter by way of example.

Particularly suitable as magnetic sensing devices in the above-mentioned receiving stations are transducers of the magneto-resistive type, comprising a resistance member or Hall plate which, when subjected to the magnetic signal field of a magnet on the conveyance or travelling object, produces a voltage change or generates a Hall voltage indicative of the corresponding magnetic orientation of the signal-transmitting magnet.

In one of the systems previously proposed particularly for mine mules, each mule is provided with a code signal carrier constituted by a group of magnets whose respective magnetic orientations, in totality, constitute a coded representation of information which, when the signal carrier passes by a stationary receiving station, are sensed by the above-mentioned magneto-resistive devices which translate the information into a corresponding group of voltages to effect the desired control operation, for example the actuation of a rail switch.

It has further been proposed, relative to a system of the general type above mentioned, to provide the signal carrier or signal-storer device on the travelling conveyance with a number of permanent magnets which are rotatably mounted individually and assume given respective positions when passing by a stationary signal-entering device. The entering device has corresponding field magnets of selected magnetic orientation respectively, so that the rotatable magnets in the storer unit are turned to corresponding positions without entering into mechanical contact with the signal-entering device. When the signal-storer device on the conveyance arrives at a receiver station, the coded signal is sensed by the above-mentioned magneto-resistive transducers. This system facilitates impressing the travelling conveyances or objects with any desired new signals.

The signal transmission in systems of the above-mentioned proximity type may become unreliable or may fail if the conveyance, in addition to its longitudinal travel on the prescribed path, may also perform transvere movements tending to impair the desired accurate signal transmission from the conveyance to the receiver device. As far as rail vehicles are concerned, it is generally possible to find a location on the vehicle at which such transverse motions remain sufficiently slight to be negligible. However, in some cases the signal-storing device cannot be mounted on the portion of the vehicle unsupported by springs so that some range of transverse motion must be put up with, depending upon the deflection of the body-supporting springs.

Lateral motions of the above-mentioned type are particularly encountered with the travelling cartridges or cylindrical containers in pneumatic tube conveyors in which the cartridges can perform pendulous motion about their longitudinal axis. In such a pneumatic conveyor plant an angular motion of the cartridge up to 30° and, in some cases up to about 45° must be taken into account.

It is an object of our invention, therefore, to improve signal-transmitting systems of the above-mentioned type in such a manner that angular or other transverse departures of the conveyance from the accurate travel path have no appreciable effect upon the reliability of signal transmission.

To this end, and in accordance with our invention, we provide the signal-storer device in a system of the above-described type, and/or the signal receiver device with magnetically active members that extend transversely of the travel path over such a length that the expectable transversal departures of the conveyance or signal-storer unit is still within the range in which a reliable signal transmission is secured.

The above-mentioned problem relates essentially only to a relative transverse displacement, including angular displacement, of the data-storer unit on the travelling conveyance, because a variation in spacing between the data-storer unit and the receiver is of minor significance. In the latter case, an increase in spacing merely results in weakening the transmitted signal without changing the signal content. In the event of a parallel displacement between transmitter and data-storer or data-storer and receiver, however, the magnetic flux between the two co-acting units may take a course differing from the one intended so that a reversal in magnetic polarity may occur. This may lead to the transmission of false signals.

In accordance with another, more specific feature of our invention, the desired reliable coaction is secured by providing the data-storer device and/or the signal transducers of the receiver with correspondingly extended pole shoes or the like magnetically active parts. Also suitable for this purpose are magnetic connecting yokes or bridges which extend a sufficient distance beyond the cross-sectional area of the appertaining magnet to remain magnetically active over the entire range of the expectable relative displacement.

According to another feature, each signal-storer member on the conveyance is provided with two magnets which are connected with each other by a transversely elongated, magnetizable yoke member of such length that the transverse spacing between the two magnets corresponds substantially to the maximum expectable transverse motion of the storer device.

According to still another feature of our invention, the magnetic-field responsive transducers in the receiver device are provided with pole sheets of corresponding length in the transverse direction. The Hall generator or other magneto-resistive sensing element may then be mounted in the middle of the transverse range, covered by the two pole sheets, within which the above-mentioned transverse displacement of the signal storer device is to be expected. The pole sheets then extend toward both sides away from the centrally located sensing element proper. According to an alternative feature, we provide each individual transducer member of the receiver with two Hall generators or the like transducer elements and interconnect them by a magnetic yoke member so that the sensing elements proper are located near the respective ends of the transverse range to be covered.

The foregoing and other objects, advantages and features of our invention, said features being set forth with particularity in the claims annexed hereto, will be apparent from the following description of the embodiments illustrated by way of example on the accompanying drawings, in which:

As mentioned, the illustrated embodiments relate to the signal transmission by means of the travelling containers or cartridges in a pneumatic tube conveyor 15 (FIGS. 3, 4, 6, 7). The number of magnets with which each cartridge 1 (FIGS. 2, 3, 6) is to be equipped depends upon the number of different control signals to be transmitted which, in turn, may be dependent upon the number of destinations to which the cartridges are to be sent selectively. Depending upon the desired destination, the respective magnets that constitute the signal-storing members of the cartridge are to be oriented in one or the other direction, either by magnetizing or reversely magnetizing them, or by turning them mechanically. When providing the cartridges with fixed magnets, these are preferably reversely magnetized at the loading station while the cartridges are temporarily kept stationary, or the reverse magnetization can be impressed upon the storer members while the cartridge is travelling from the loading station. The proper magnetization and reverse polarization of the cartridge magnets is effected by correspondingly adjusted field structures in a signal-entering unit. These field structures may also consist of permanent magnets. In cases where the magnets on the cartridge are pivotally mounted, the necessary mechanical adjustment can be effected, for example, by manually turning the magnets to the proper positions. While the cartridge travels from the loading station (FIG. 6) and reaches a switch in the tube system, a receiving station (FIG. 7) located shortly ahead of the switch responds to the stored signal and, if the signal is indicative of that particular station, operates to place the conveyor switch to the position required to direct the travelling cartridge to the proper destination.

The signal-entering device at the loading station (FIG. 6) may comprise a control desk with pushbutton contacts for the respective destinations so that it is only necessary for the attendant to depress the proper pushbutton. The travelling cartridge then automatically issues the control signals that are needed for automatically setting the switches to the positions required for passing the cartridge to the selected destination. It will be understood that once a cartridge is thus dispatched from a loading station, it carries the proper directing signal with it, so that another cartridge can immediately be dispatched from the same loading station.

Figure 1:
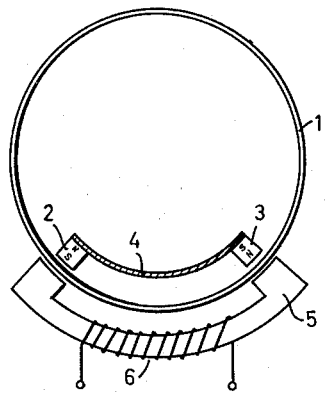
FIG. 1 is a schematic cross-sectional view of a pneumatic conveyor cartridge with a signal-storing member located just opposite one of the magnetic field structures in the loading or other station where the magnetic code signal is impressed upon the cartridge.

As shown in FIG. 1, a number of magnets are mounted in or on the wall of the cylindrical cartridge 1. The magnets are provided in pairs. The two magnets 2 and 3 of each pair are spaced from each other along the periphery a distance corresponding to the maximal angular displacements to which the cartridge may be subjected when travelling. The two magnets 2, 3 are interconnected by an elongated magnetizable yoke piece 4. Each of the structures 2, 3, 4 constitutes one of the signal-storer members of the cartridge.

During travel, the cartridge may perform pendulous motion about its axis. Since the gravity center of the cartridge is located below the center axis and since generally means are provided for stabilizing the gravity center, the pendulous amplitude, as a rule, remains below an angular amount of about 30°. However, as a matter of precaution, an angular departure of ±45° is taken into account with the illustrated embodiment, corresponding to a total pendulous amplitude of 90°.

According to the invention, such angular departure is also taken into account at the receiver station and, if desired, also at the signal-entering device of the starting or loading station.

The magnets 2 and 3 are fixed relative to the cartridge and may have to be reversely magnetized in order to be impressed with the proper magnetic signal. For this purpose the signal-entering device at the loading station is provided with magnetizing field structures whose number corresponds to the number of signal-storer members on the cartridge and hence also to the number of signal transducers in the receiving station. According to FIG. 1, each field structure in the signal-entering device consists essentially of an electromagnet comprising an iron core 5 and a magnetizing winding 6. The core 5 is elongated in the transverse, i.e. peripheral, direction of the cartridge and its pole faces are angularly spaced apart the same amount as the reverse magnetized magnets 2 and 3 of the storer member in the cartridge.

Figure 2:
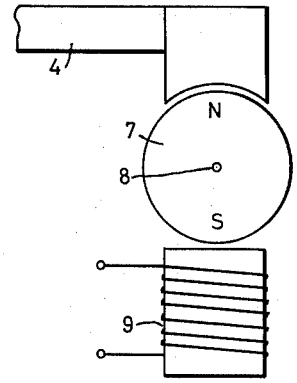
FIG. 2 shows schematically one of the signal-storing members of the cartridge, also in proximity to a signal-impressing field structure, in which the signal-storing element proper consists of a rotatably mounted permanent magnet.

FIG. 2 shows partially a modified embodiment of a signal-storer member to be mounted on the cartridge and a portion of a corresponding signal-entering field structure. According to FIG. 2, each of the two magnets 7 that, together with an interconnecting magnetizable yoke 4, constitute one of the respective signal-storer members is made of a permanent-magnet material of sufficiently high remanence to retain its original polarization, indicated by N and S. However, in order to control the magnetic orientation of each magnet 7 for the purpose of signal transmission according to the invention, the magnet is rotatably mounted on a pivot 8.

The signal-entering device according to FIG. 2 comprises an electromagnet 9 for each permanent magnet 7 of the signal-storer member and causes the magnet 7 to turn 180° about its axis if the particular signal to be impressed requires a reversal in magnetic polarities.

The above-described impression of signals upon the storer members of the cartridge may be effected outside of the pneumatic-tube conveyor system, with the cartridge temporarily at rest and placed in proper positional relation to the signal-entering device. If desired, however, the signal-entering device may be located at the conveyor tube and may effect its operation as the cartridge commences its travel, or during travel of the cartridge. In the latter case, the above-described signal-entering and signal-storing devices, due to their extended length in the transverse peripheral direction, will reliably operate even if the cartridge, at the signal-entering point of the tube system, has already performed some pendulous departure from its normal position.

Figure 3:
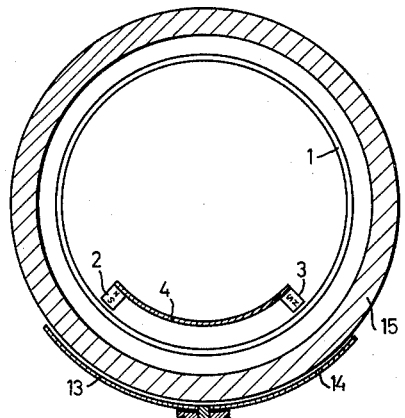
FIG. 3 is a schematic cross-sectional view of a pneumatic tube at the location of a receiving station, showing a signal-storer member according to FIG. 1 in proximity to the corresponding transducer member of the receiving station.

FIG. 3 shows schematically the cartridge and signal-storer member of FIG. 1 located within the pneumatic conveyor tube 15 and just passing by the location of one of the transducer members in the sensing device of a receiving station. The transducer member comprises a Hall plate 10 of semiconductor material such as indium arsenide or indium antimonide. The Hall plate is located between the magnetizable pole pieces 11 and 12 which are magnetically joined with magnetizable pole sheets 13 and 14 respectively. The length of the pole sheets in the transvers direction, i.e., peripherally of the conveyor tube 15, is so large that a definite signal is magnetically active upon the magnetizable system of the Hall plate and hence upon the Hall plate itself, within the entire pendulous amplitude of the conveyor cartridge. The transducer member is mounted on the outer side of the pneumatic tube 15 consisting of brass or other non-magnetic material. When the signal-storer member of the cartridge passes through the illustrated position in which it is located opposite the corresponding transducer member of the receiver device, the magnetic field of the magnets 2, 3 acts upon the magnetizable structure of the transducer member and causes a corresponding voltage to appear across the Hall plate, this voltage having a polarity dependent upon the polarization previously impressed upon the signal-storer member by the signal-entering device at the loading station. This voltage is then used to perform a predetermined control operation as will be more fully described below.

Figure 4:
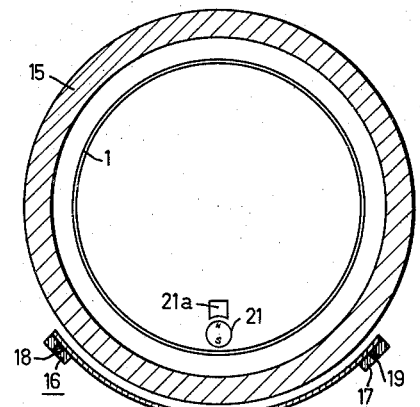
FIG. 4 is a cross section similar to FIG. 3 but shows a signal-storer element according to FIG. 2 in the vicinity of a modified transducer member of a receiving station.

In the modification illustrated in FIG. 4, each transducer member of the receiving device is provided with two transducer heads 16, 17 of which each comprises a Hall plate 18 or 19. The two transducer heads are magnetically interconnected by a magnetizable yoke member 20 consisting of sheet metal. The length of the yoke member 20 peripherally of the conveyor tube 15 corresponds to the pendulous range of cartridge motion. The two transducer heads have their respective Hall-voltages so interconnected that the resultant output voltage is the sum of the two individual Hall voltages, as will be explained below with reference to FIG. 7.

The provision of two Hall generators has the advantage that each signal-storer member of the cartridge need be provided with only one permanent magnet. Thus, FIG. 4 shows a single permanent magnet 21 which is rotatably mounted in the same manner as explained above with reference to magnet 7 in FIG. 2. A fixed pole piece 21a of soft-magnetic (high-permeability) material is provided in order to secure the magnet in the selected one of its two magnetic orientations so that either the north pole or the south pole, depending upon the entered signal, is located adjacent to the signal-transducer member. It will be understood that when using a transducer member with two Hall-voltage generators according to FIG. 4, the signal-storer member of the cartridge may also be provided with a fixed magnet whose magnetic polarization is reversible and controlled by the signal-entering device substantially in the manner explained above with reference to FIG. 1. The use of a single permanent magnet instead of the two magnets used in the storer member according to FIGS. 1 and 3 reduces the space requirements as well as the weight of the signal-memorizing equipment on the cartridge.

Figure 5:
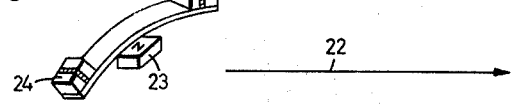
FIG. 5 is a schematic and perspective view of a total of four signal storer members with which a single cartride may be equipped.

For proper signal transmission, the cartridge or other conveyance is to be provided with a plurality of signal-storer members such as those described above, and a corresponding number of signal-entering field structures is needed in the loading station, the same number of transducers being needed in the receiver station. Thus, FIG. 5 shows schematically the provision of three permanent magnets 23a, 23b, 23c fixedly mounted on the conveyor cartridge as described above. These three magnets (FIGS. 5, 6) are shown in the instantaneous position in which they simultaneously act upon three transducer members denoted by 24a, 24b, 24c. The transducer members correspond to the one shown in FIG. 4 and described above. That is, the signal-storer assembly comprises a total of three flat and arcuate yoke members 20 (FIG. 4) and a total of six Hall-voltage transducer heads such as those denoted by 18 and 19 in FIG. 4. It is preferable to provide the cartridge with an additional permanent magnet 23 (FIGS. 5, 6) or equivalent signal storer member, which is located at a different place of the cartridge and cooperates with another transducer member of the receiving station. The latter transducer member is shown in FIG. 5 to comprise two transducer heads 24. It is preferable to mount the code-signal transducer members 24a, 24b, 24c one one side, such as at the bottom, of the cartridge while providing the pilot magnet 23 and accordingly the appertaining transducer member 24 at the top. The pilot magnet 23 has such a position relative to the other storer magnets, and is magnetically so oriented, that when the cartridge travels in the direction of the arrow 22 through the instantaneous position illustrated in FIG. 6, the performance of the signal transducer members 24a, 24b, 24c is controlled in dependence upon signals issuing from the transducer member 24 of the pilot magnet. That is, the pilot magnet 23 furnishes in its appertaining transducer member 24 a command which causes the other transducer members to become active in response to the magnetic fields of the respective storer magnets 23a, 23b, 23c. As a result, the moment at which the receiver responds to the stored signals is accurately defined even at high travelling speeds of the conveyor cartridge.

Figure 6:
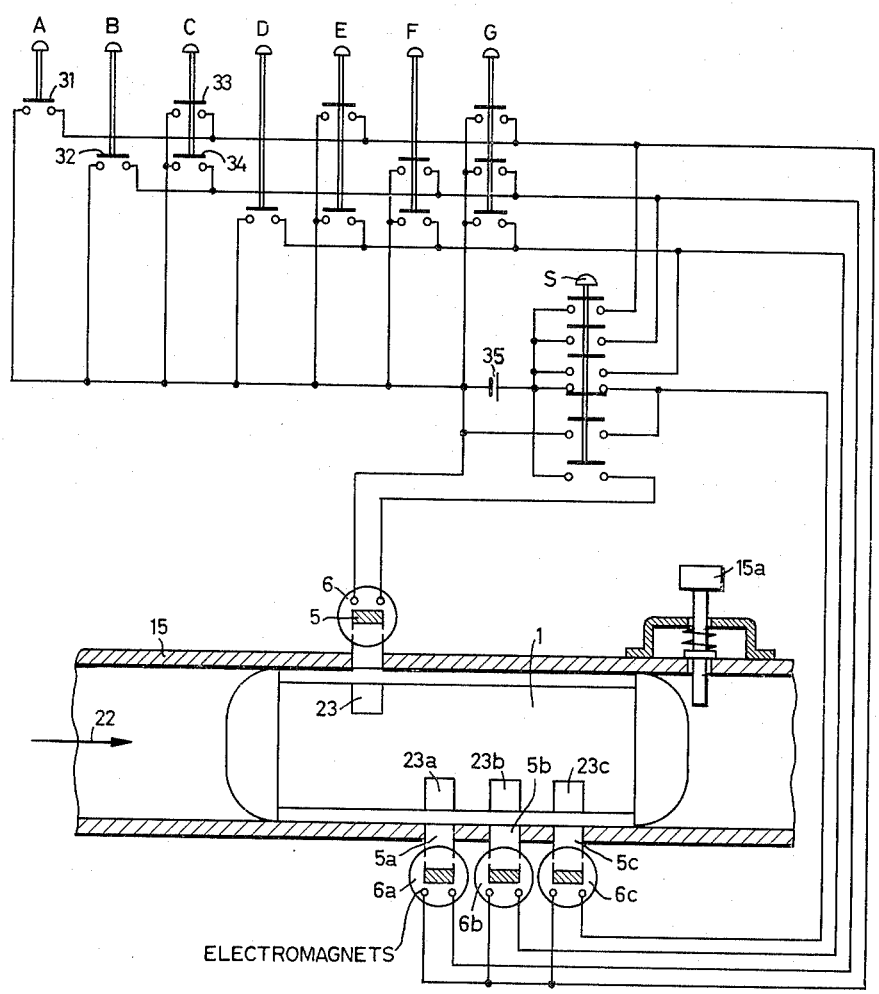
FIG. 6 shows, partially in section, a pneumatic-tube cartridge equipped with the signal-storer members shown in FIG. 5, and also illustrates the circuit diagram of a signal-entering station for impressing coded magnetic signals upon the signal-storer elements of the cartridge.

FIG. 6 shows the cartridge 1 with a total of four signal storer members 23, 23a, 23b, 23c already inserted into the pneumatic tube 15 but temporarily arrested at the signal entering device by a latch 15a which, upon entering of the signals, is released manually or automatically. The signal entering device is equipped with four field magnets of the type described above with reference to FIG. 1. The core structures of these field magnets are denoted by 5, 5a, 5b, 5c and the appertaining magnetizing coils are denoted by 6, 6a, 6b, 6c respectively.

A control panel or desk is provided with seven pushbutton contacts A to G, the number of these pushbuttons corresponding to that of the receiving stations to which each cartridge can be directed. This is done by depressing the corresponding one pushbutton, it being understood that the pushbuttons may be interlocked in the conventional manner so that only one can be depressed at a time. Each pushbutton has normally open contacts such as those denoted by 31, 32, 33, 34.

At the beginning of the signal entering operation a starter switch S is temporarily actuated. The switch connects a current source 35 to all magnetizing coils 6, 6a, 6b, 6c with a fixed polarity. This impresses upon the pilot member 23 of the cartridge a corresponding fixed polarity and also has the effect that the signal entering operation proper is commenced with all other signal storer members 23a, 23b, 23c set to a predetermined magnetic polarity. Then the operator depresses the particular pushbutton assigned to the intended destination, for example the button C. The contacts 33 and 34 of pushbutton C now reversely energizes the coils 6a and 6b thus reversely polarizing the signal-storer members 23a and 23b of the cartridge, while the storer member 23c retains its previous polarity. The code combination of polarities now exhibited by storer members 23a, 23b and 23c corresponds to the intended destination. Thereafter, the cartridge is released by latch 15a and travels through the conveyor tube system. When any of the other pushbuttons A to G is depressed, a different code combination of magnetic polarities is impressed upon the signal storer members of a cartridge, each time corresponding to the selected destination.

Figure 7:
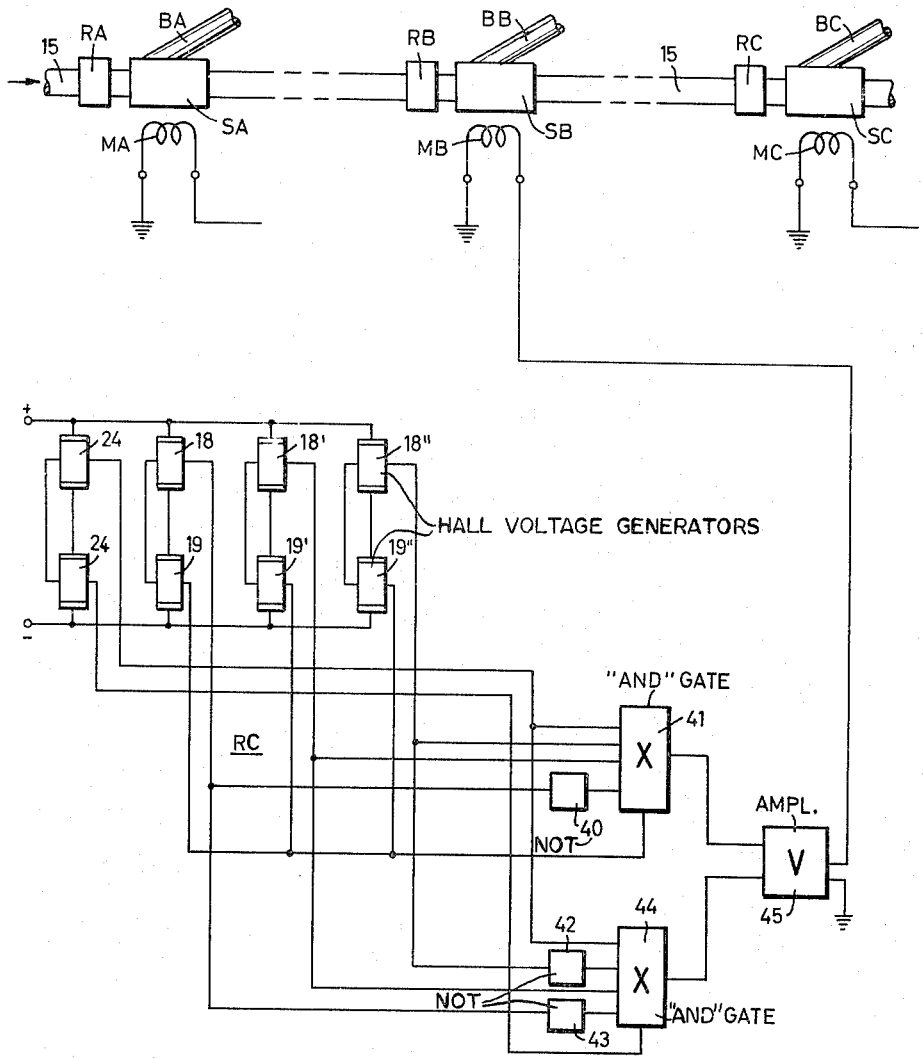
FIG. 7 shows schematically a pneumatic tube system with a number of switches, in conjunction with the electric circuit diagram of one of the receiving stations for controlling one of the switches.

According to FIG. 7, the pneumatic conveyor tube is provided with switches that correspond to the selectively available receiving stations. Three of these switches are shown at SA, SB, SC. They are correlated to respective pushbuttons A, B and C of FIG. 6. Each switch has a control magnet MA, MB or MC. If the magnet is energized, the switch will deflect the arriving cartridge from the straight path to pass it into a side branch BA, BB or BC of the conveyor.

Shortly before the travelling cartridge enters into a switch, it passes through a readout or receiver device RA, RB or RC. Each receiver device is provided with four transducer members as shown in FIG. 5. Illustrated in FIG. 7 are the two Hall plates 24 of the transducer member that responds to the pilot magnet 23 of the cartridge. The three other transducer members 24a, 24b, 24c according to FIG. 5 are each provided with two Hall plates denoted in FIG. 7 by 18 and 19, 18' and 19', and 18" and 19". Each Hall plate consists essentially of a rectangular semiconductor wafer of indium arsenide or indium antimonide and has two terminals on its respective narrow edges. A constant direct current is passed serially through the two Hall plates of each transducer member, passing from one to the other terminal in each plate. Each Hall plate further has two Hall electrodes located on the respective long edges midway between the two terminals. When a signal is being received in the above-described manner a Hall voltage appears between the two Hall electrodes of each plate. As shown in FIG. 7, the Hall-voltage output circuits of the two Hall plates in each transducer are connected in series so that the resultant output voltage is the sum of the two Hall voltages.

The circuit diagram illustrated in FIG. 7 relates to the receiver device RB and causes energization of the switch magnet MB when the proper code signal is being received. The other receiver devices, such as those denoted by RA and RC are each provided with circuitry corresponding to the one shown for receiver RB, except for a difference in the coincidence gating network described below.

The switch magnet MB is to be energized under control by the receiver RB when the code-group of the signal corresponds to the one impressed upon the storer members of the cartridge by the above-described actuation of the pushbutton B in the signal entering device of FIG. 6. For that purpose, the receiver circuit is provided with "not" gates 40, 42 and 43, and AND gates 41 and 44. The issuing signal is amplified in an amplifier 45 whose output circuit is connected to the switch magnet MB. In order to have the signal combination become effective only when the pilot magnet is located at the transducer member with Hall plates 24, one of the input circuits of the AND gates is occupied by the output signal from the pilot Hall plates 24. As a result, the signal sensing operation takes place only at the moment when the pilot magnet reaches the proper instantaneous position opposite the Hall plates 24.

In the illustrated embodiment of the receiver, the coincidence gates are such that the switch magnet MB is actuated in the above-described manner when either the push-button B or the pushbutton F was depressed in the signal entering device (FIG. 6). It is assumed that the cartridge, then travelling in the branch line BB will pass through one or more other switches controlled to direct the cartridge to respectively different destinations depending upon whether pushbutton B or F was actuated.

If the code signal is not the one proper for operation of the switch magnet MB, the cartridge continues its travel. Before it reaches the next switch, another sensing operation is performed in the appertaining receiver and the switch is caused to deflect the cartridge to the proper side branch if the signal combination of the cartridge corresponds to the one to which the gates in the receiver circuit are adapted.

It will be understood that the number of selectively available destinations can readily be increased by providing for a selective change in the magnetic polarization of the pilot magnet 23.

It will be understood by those skilled in the art, upon a study of this disclosure, that our invention permits of various modifications with respect to structural details and circuitry, and hence can be given embodiments other than particularly illustrated and described herein, without departing from the essential features of our invention and within the scope of the claims annexed hereto.

We claim:

1. A tubular conveyance system comprising a tubular conveyor, a tubular conveyance adapted to slide through said conveyor and being biased toward a predetermined angular position, variable magnetic means on said conveyance, magnetic storer means at one location on said cylindrical conveyor for varying the magnetic orientation of said magnetic means on said conveyance, a pair of Hall voltage sensing devices located on said conveyor remote from said storer means for responding to the orientation of said variable magnetic means when said conveyance is nearby and assumes either the predetermined angular position or one departing therefrom, said Hall voltage sensing devices being spaced from each other along the periphery of said tubular conveyor and being joined by a magnetizable yoke extending peripherally along said tubular conveyor.

2. A tubular conveyance system comprising a tubular conveyor, a tubular conveyance adapted to slide through said conveyor and being biased toward a predetermined angular position, variable magnetic means on said conveyance, magnetic storer means at one location on said cylindrical conveyor for varying the magnetic orientation of said magnetic means on said conveyance, Hall voltage sensing means located on said conveyor remote from said storer means for responding to the orientation of said variable magnetic means when said conveyance is nearby and assumes either the predetermined angular position or one departing therefrom, said Hall voltage sensing means having a magnetizable yoke system extending peripherally therefrom along said tubular conveyor.

3. A tubular conveyance system as claimed in claim 2, wherein said variable magnetic means comprises a plurality of polarity-controllable magnets mounted one behind the other relative to the direction of sliding said tubular conveyance, and wherein said Hall voltage sensing means comprises a plurality of Hall voltage sensing devices equal in number to said magnets and mounted one behind the other in said direction of sliding.

4. A tubular conveyance system as claimed in claim 3, wherein said variable magnetic means further comprises an additional pilot magnet having relative to said direction of sliding a position different from that of the other magnets thereof, wherein said Hall voltage sensing means comprises an additional Hall voltage sensing device responsive to said pilot magnet and located relative to said direction of sliding in a position differing from that of the other of said Hall voltage sensing devices in correspondence with the position of said pilot magnet, and wherein said magnetic storer means comprises a plurality of polarity-controllable magnets mounted one behind the other in said direction of sliding of said tubular conveyance equal in number and corresponding in position to the magnets of said variable magnetic means on said conveyance.

References Cited by the Examiner
UNITED STATES PATENTS

| | | | |
|---|---|---|---|
| 2,476,110 | 7/1949 | Neufeld | 179—100.2 |
| 2,773,658 | 12/1956 | Van Ottern | 243—16 |
| 2,856,256 | 10/1958 | Carmen | 340—174.1 |
| 2,857,059 | 10/1958 | Goerlich | 340—174.1 |
| 2,866,013 | 12/1958 | Reis | 340—174.1 |
| 2,900,451 | 8/1959 | Haustad | 340—174.1 |
| 2,970,791 | 2/1961 | Hafner | 243—16 |

IRVING L. SRAGOW, *Primary Examiner.*